ated Oct. 27, 1970

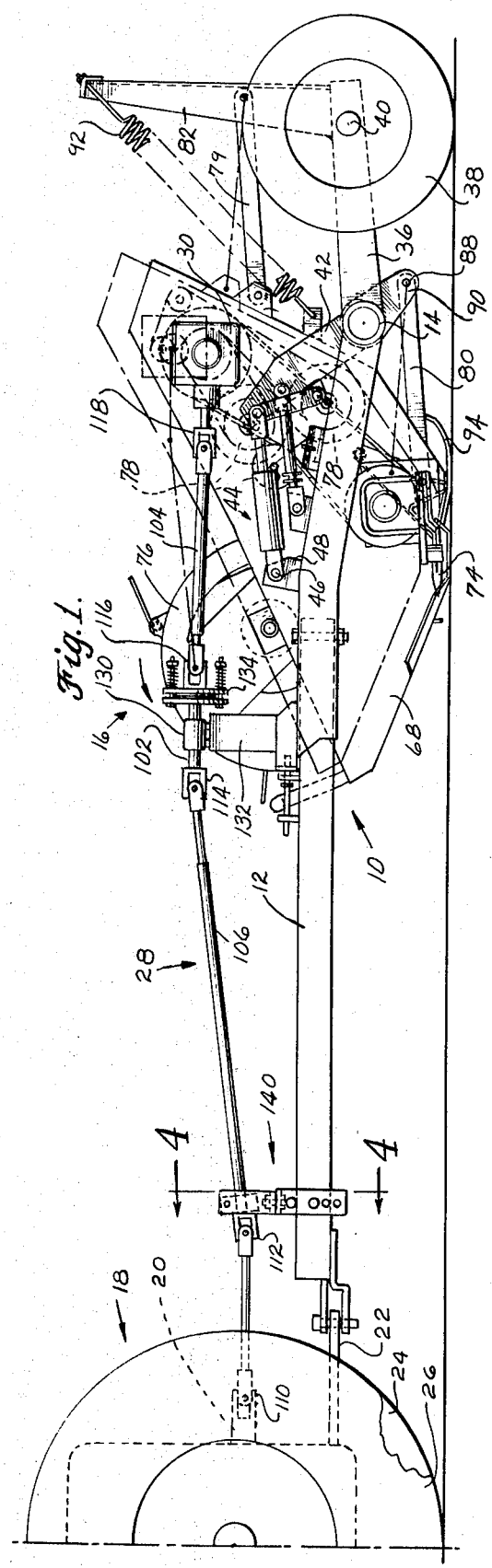
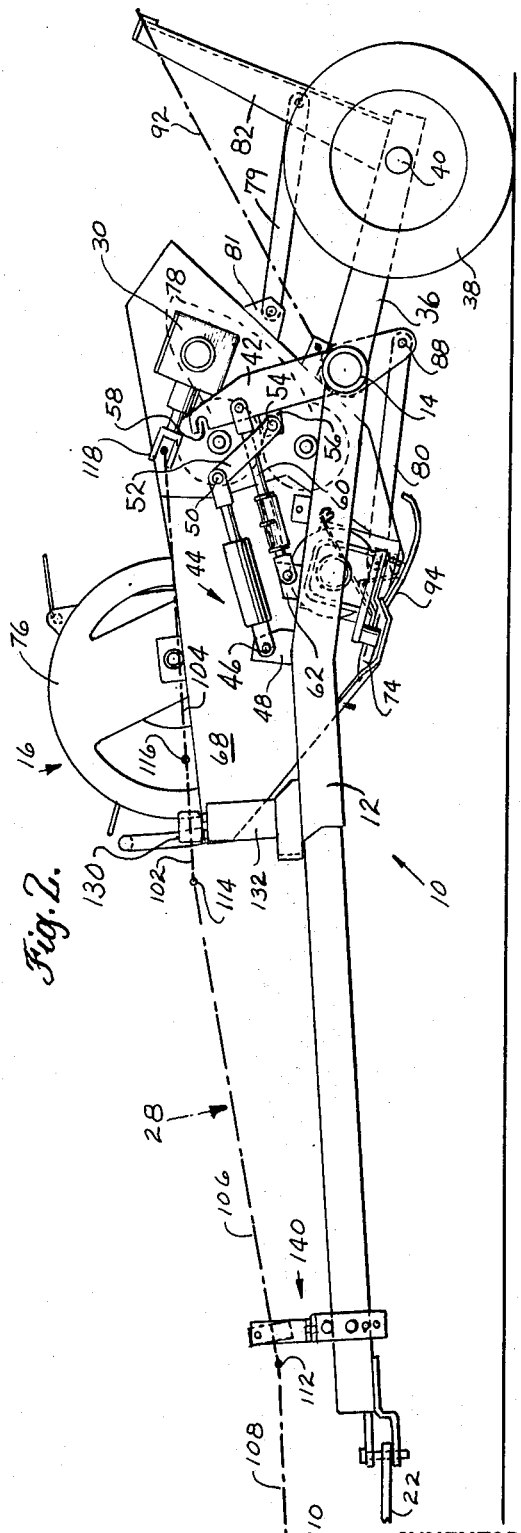

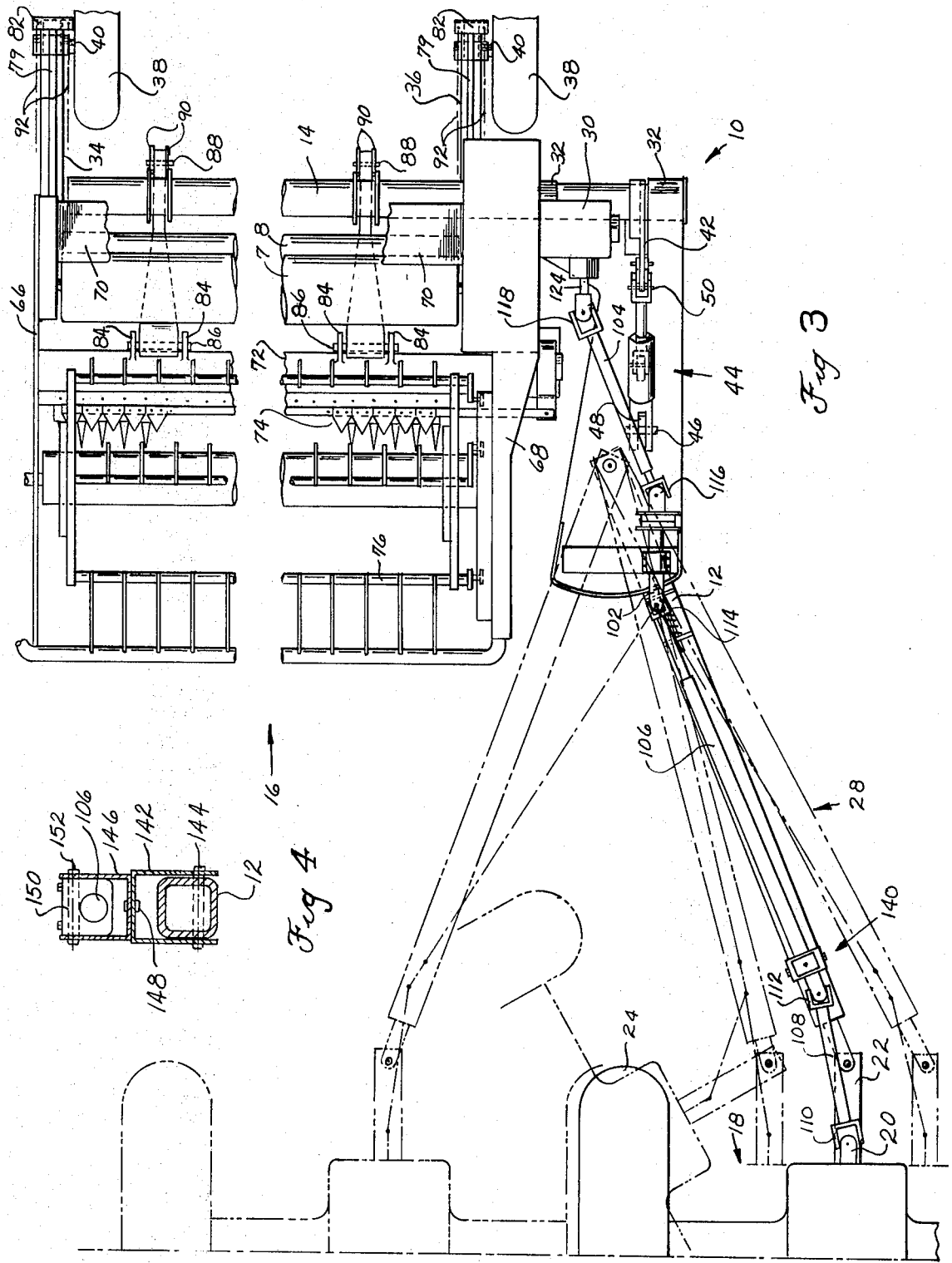

United States Patent Office 3,535,860
Patented Oct. 27, 1970

3,535,860
DRIVE SYSTEM FOR PULL-TYPE MOWER-CONDITIONER
Bruce D. Schwalm, Earl A. Hudson, and Henry N. Lausch, Leola, Pa., assignors to Sperry Rand Corporation, New Holland, Pa., a corporation of Delaware
Filed Mar. 5, 1969, Ser. No. 804,537
Int. Cl. A01d 47/00
U.S. Cl. 56—23                                          8 Claims

ABSTRACT OF THE DISCLOSURE

An agricultural implement for mowing and conditioning crops, the implement being drawn by a tractor. The implement includes a frame and a header mounted thereon, the header being movable vertically independently of the frame during working operations. The frame may be shifted to various working conditions laterally of the tractor. An improved drive line interconnects the power take-off of the tractor with the header to drive the conditioning rolls and other devices on the header with little angular acceleration during turns and in the various working positions.

FIELD OF INVENTION

The present invention relates generally to agricultural implements and more particularly to pull-type mower-conditioners having a frame which carries a header, the header being movable vertically independently of the frame during normal working operations so that the header may follow the contour of the ground.

DESCRIPTION OF PRIOR ART

Mower-conditioners of the type to which this invention relates are a relatively recent innovation. In these machines a tractor drawn frame supports a header having a mower, a reel, and conditioning rolls disposed rearwardly of the reel. As the machine is propelled forwardly through a field having crops to be harvested the mower will cut the crop material, the reel will convey the cut material towards the conditioning rolls, and the rolls will condition the material by crushing and/or cracking the stems. A drive line interconnects the tractor power take-off with the reel, mower, and conditioning rolls.

The U.S. Pat. No. 3,325,981 to Glass et al. issued June 20, 1967 discloses one of the first mower-conditioners placed into production. In this design a relatively high frame was employed with ground supporting wheels being rigidly mounted on a lower portion of the frame. A header unit was mounted on the frame for swinging movement about the axes of the wheels. The implement was placed in its transport position by raising the header relative to the frame. The drive from the tractor P.T.O. to the header went through a frame mounted gearbox whose output shaft was coaxial with the land wheels, the output shaft in turn being connected with the various driven components on the header. The drive shaft to the gearbox employed two parallel shafts interconnected by universal joints mounted on an intermediate shaft. With this particular design there was no angular acceleration of the various components regardless of position of the header or of the hitch with relation to the frame when the tractor was in its straight ahead position. However, when turning, there would be some angular acceleration imparted to the components on the header as the power take-off shaft on the tractor would not be parallel to the gearbox drive shaft.

A subsequent mower-conditioner design is shown in Joseph H. Cyr Belgium Pat. No. 705,563 granted Nov. 30, 1967. In this design a low frame having a principal transverse frame member is provided. Ground supporting wheels are mounted to the rear of the principal transverse frame member and are vertically shiftable to place the implement in its transport position. The header is mounted for swinging movement about the transverse frame member. The drive to the header extended through a gearbox mounted on the frame, the gearbox having an output shaft which drives a belt which is in turn coupled to an input shaft on the header by a double universal joint connection. As the shafts which are connected together by the double universal joint connection remain parallel in various operating positions there is no angular acceleration within the various components of the header, except during turning.

In a more recent frame design, which is the type shown in this application, a low frame having a transverse frame member is employed, the frame being shifted to a transport position by vertically movable wheels mounted to the rear of the transverse frame member. The header, however, is supported for vertical shifting movement by parallel arms. With this form of header mounting it is not practical to use the drive line configuration of the earlier machines, and it is desirable to mount the gearbox directly on the header. A first drive line configuration was designed for this particular frame, the first drive line employing an intermediate pivoted belt drive. This drive line was, however, not entirely satisfactory as there was considerable angular acceleration of the driven components in various working positions.

SUMMARY OF INVENTION

It is an object of this invention to provide a drive line for a header for a mower-conditioner in which the header is mounted for vertical shifting movement during working by parallel arms, the drive line including a gearbox mounted on the header.

More particularly, it is an object of the present invention to provide a drive line for connecting a vertically movable header to the power take-off of a tractor, the drive line including an intermediate shaft parallel to the input shaft on the header mounted gearbox when the header is in its various working positions, and further shaft means which interconnect the intermediate shaft with the power take-off.

A further object of this invention is to provide, for a mower-conditioner of the class described, a drive line which is durable and which will impart minimal angular acceleration to the various driven components on the header when in various working positions.

In summary, a drive line is provided for a mower-conditioner having a fore-and-aft extending frame member and a lower transversely extending frame member, the header for the mower-conditioner being mounted forwardly of the transverse frame member and adapted to be shifted vertically, the header being supported by two pairs of parallel links. The improved drive line includes a gearbox mounted on the header and having a fore-and-aft extending input drive shaft. An intermediate shaft is journalled on the fore-and-aft extending frame member in parallel relationship to the input shaft on the gearbox and is connected thereto by a rear telescoping shaft assembly and two universal joints. Extending forwardly from the intermediate shaft journalled on the frame are first and second forward shafts, the most forward of the forward drive shafts being connected to the power take-off of a tractor by a universal joint and to the other forward shaft by a further universal joint. Said other forward shaft is telescopic and is connected to the intermediate shaft journalled on the frame by another universal joint. A forward portion of said other forward shaft is supported on the forward end of the frame for limited movement. By employing the above drive line the objects of this invention are realized.

The above and other objects and advantages of this invention will be apparent to those skilled in the art after a consideration of the following detailed description, taken in conjunction with the accompanying drawings in which a preferred form of this invention is illustrated.

BRIEF DESCRIPTION OF THE DRAWINGS

FIG. 1 is a side view of the mower-conditioner in which the principles of this invention are employed, the header of the mower-conditioner being shown in an intermediate operative position in full lines and in a raised operative position in broken lines.

FIG. 2 is a side view of the mower-conditioner shown in FIG. 1 in which the header is disposed in a fully raised transport position.

FIG. 3 is a plan view of the mower-conditioner in which the principals of this invention are incorporated, the mower-conditioner being shown in full lines in its normal working position and in various other positions in broken lines.

FIG. 4 is a sectional taken along the lines 4—4 in FIG. 1.

Description of a preferred embodiment

In the following description right hand and left hand reference is determined by standing to the rear of the mower-conditioner and facing the direction of travel.

Referring now to the drawings in general, the drawn mower-conditioner in which the principals of this invention are incorporated include a generally L-shaped main frame indicated generally at 10, the main frame disposed to either side of the rocking lever 42 and being pivotally secured thereto by means of a further pivot pin 54, the pin 54 securing the straps 52 to a lug 56 on the rocking lever 42. When the cylinder is extended to raise the frame to its transport position the pin 50 bears against notch 58 in the upper end of the rocking lever 42. A transport brace 60 extends between lug 62 on the frame member 12 and the rocking lever 42 and may be used to hold the header 16 in its raised transport position.

The header 16 includes right and left hand side frame members 66, 68 which are interconnected by upper and lower transversely extending frame members 70, 72, respectively. A sickle bar mower 74 is carried by the lower transverse frame member 72 and a reel 76 and a reel 76 and a pair of conditioning rolls 78 are rotatably carried by the side frame members. The reel 76 is rotated in the direction of the arrow in FIG. 1 and causes crop material to be swept into the sickle bar mower 74. The conditioning rolls 78 are mounted closely adjacent to the reel 76 and strip the cut material from the reel. Drives extend from the gearbox 30 mounted on the left side frame member 68 to the sickle bar mower, the reel and the conditioning rolls.

The header 16 is carried by right and left hand pairs of links, each pair of links including an upper link 79 and a lower link 80. Each upper link 79 is pivotally secured to rearwardly extending lugs 81 on the right and left side frame members by means of a conventional pivot pin the rear end of the upper link being in turn pivotally secured to an upstanding member 82 whose lower end is welded or otherwise rigidly secured to the rear end of the rock arms 34, 36. The lower links 80 extend between the lower transverse member 72 and the transverse frame member 14. To this end right and left pairs of aperture lugs 84 are provided, the lugs being mounted to the rear of the lower transverse frame member 72. A pin 86 extends between each pair of aperture lugs 84 and the forward end of the lower links are pivotally secured about said pin. The rear end of the lower links are pivotally secured about a pin 88 carried between depending arms 90, the arms being rigidly secured to the transverse frame member 14. Springs 92 extend between the upper end of the upstanding member 82 and the header 16 and serve to act as a counterweight for the header.

The header is provided with shoes 94 which rest upon the ground when the header is in its lowered operating position. In this position the header will follow the contour of the ground, that is to say it will swing upwardly and downwardly on the parallel links as it is advanced forwardly over the field.

The improved drive 28 of this invention includes a shaft 102 journalled on the elongated frame member 12 in a manner more fully set forth below, a rear telescoping drive shaft 104, a forward telescoping drive shaft 106 and a forward shaft 108 of a fixed length. Universal joints 110, 112, 114, 116 and 118 interconnect the tractor power take-off shaft 20 on tractor 18 with the fixed length forward drive shaft 108, the forward telescoping drive shaft 106, the drive shaft 102, the rear telescoping drive shaft 104 and the input shaft 124 of gearbox 30, respectively.

The drive shaft 102 is journalled in bearing block 130, the bearing block 130 in turn being supported on a tower 132 whose lower end is rigidly secured to the elongated frame member 12. The shaft 102 is parallel to the input shaft 124 of the gearbox 30 when the header 16 is in its normal operating condition shown in FIG. 1. To this end it should be noted that as the upper and lower parallel links are parallel to each other and of the same length that as the header moves up and down relative to the frame, either in response to the shoes encountering higher or lower portions of ground surface as the machine is propelled forwardly, or the wheels 24, 26 encountering higher or lower surfaces, or a combination of the above factors, the header will retain the same attitude with respect to the frame 12, 14. Thus, as the shaft 124 moves upwardly or downwardly with respect to the shaft 102 equal angles will be defined at the inversal joint 116, 118. Thus, the input shaft 124 will have the same angular velocity as the shaft 102. It should be noted at this point that a slip clutch 134 is provided in shaft 102. Obviously, if the clutch 134 would slip the shafts would not have the same angular velocity, however, in normal operating conditions they would.

It is not possible, however, to maintain the shaft 102 in parallel relationship with the tractor power take-off shaft 20. The reasons for this are two-fold. One reason is that as the tractor turns relative to the implement the angles between the PTO and the shaft 102 will vary. This can bes be seen from FIG. 3 wherein the tractor is shown in full line in one of its normal operating positions with the tractor being in a position to move straight ahead. In the dash-dot position the tractor is shown making a relative sharp turn with respect to the header. In this position it is obvious that the angle between the power take-off shaft 20 and the frame mounted shaft 102 has been varied from that position shown in the full lines. The second reason that the shaft 102 cannot remain parallel the shaft 20 is that as the machine advances forwardly over the ground and the wheels 24, 26 encounter high or low spots in the field, the unit 10 will pivot as a whole about the tractor drawbar 22, therefore, causing the shaft 102 to swing relative to the tractor.

While a two universal drive could be employed between the power take-off shaft 20 and the frame mounted shaft 102, it has been found that this drive would not be satisfactory as the forward universal joint would be disposed at undesirably large angles when turning. Accordingly, a drive shaft design employing three universal joints has been adopted. To further reduce the angularity of the forward universal joint 110 the shaft 108 is of fixed length. To provide support for the intermediate universal joint 112, the fixed length shaft 108, and the telescoping drive shaft 106, a support, indicated generally at 140, is provided. This support (FIG. 4) includes a lower U-shaped member 142 whose legs are pivotally secured to an apertured portion on the forward end of the frame 12 by means of a transversely disposed pivot pin 144. An upper U-shaped member 146 is in turn secured to the lower U-shaped member 142 by means of a vertically extending pin 148, the upper U-shaped member being able to rotate about a vertical axis defined by the pin 148. The forward end of the telescoping drive shaft 106 has mounted thereon a tipping bearing 150. The tipping bearing is in turn secured to the upwardly extending leg of the upper U-shaped member 146 by means of a normally transversely extending pin 152 which passes through apertures of the upper ends of the legs of the upper U-shaped member 146 and a corresponding aperture in the upper end of the tipping bearing 150. By implying this particular support the drive shaft 106 can assume various positions dependent on the position of the tractor relative to the frame 12.

In order to further reduce the angular acceleration imparted to the shaft 102 when in various positions of operation the drive system was subjected to computer analysis. Studied in addition to the two factors effecting the parallelism of the shaft 102 with respect to power take-off shaft 20 was the factor of swinging the forward portion of the frame 12 to various operating positions. As illustrated in FIG. 3 the forward portion of the frame 12 may be positioned in a normal operating position, which is illustrated in full line, or in slightly different positions to either side, indicated by the broken lines. It was found that minimal angular acceleration could be achieved if the shaft 102 was disposed at a slight angle to the fore-and-aft center line of the implement. More particularly, it was found that if the shaft 102 is disposed at 5°40′ towards the tractor away from the normal fore-and-aft center line of the implement, that the optimum results are achieved.

Thus, a drive has been provided to a vertically shiftable header on a drawn mower-conditioner in which minimal angular acceleration is achieved.

While this invention has been described in connection with a particular embodiment thereof, it will be understood that it is capable of modification, and this application is intended to cover any variation, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A drawn agricultural implement adapted to be propelled forwardly by a prime power source vehicle having power take-off (PTO) shaft means, said implement comprising, in combination:
   a ground supported frame,
   a headed mounted on the frame for vertical shifting movement relative to the frame through a range of operative positions,
   power driven crop harvesting means mounted on the header,
   a header mounted power input shaft drivingly interconnected with said crop harvesting means, and
   drive means operable to transmit power from the PTO shaft means to the header mounted power input shaft with minimal angular acceleration as the header moves vertically through its range of operative positions and as the frame moves relative to the vehicle, said drive means including:
   a shaft rotatably journalled on said frame in parallel relationship to said power input shaft,
   rear drive shaft means extending between the frame journalled shaft and the power input shaft,
   forward drive shaft means extending between the PTO shaft and the frame journalled shaft, said forward drive shaft means including an intermediate portion having a universal joint,
   means supporting the intermediate portion of the forward drive shaft means for limited movement relative to the frame, and
   universal joint means interconnecting the PTO shaft, the forward drive shaft means, the frame journalled shaft, the rear drive shaft means, and the power input shaft.

2. The implement set forth in claim 1, wherein a safey overload clutch means is disposed on said frame mounted rotatable shaft.

3. The implement set forth in claim 1, wherein said frame journalled shaft is supported on an upper portion of a bearing tower, a lower portion of said bearing tower being rigidly secured to said frame.

4. The implement set forth in claim 1, wherein said means supporting the intermediate portion of the forward drive shaft means includes a tipping bearing assembly mounted on a forward portion of the frame, said forward drive shaft means including a forward shaft of fixed length and a telescoping drive shaft disposed between the forward shaft of fixed length and the frame journalled shaft.

5. The implement set forth in claim 4, wherein the tipping bearing assembly supports the forward end of the telescoping drive shaft which extends between the forward shaft of fixed length and the frame journalled shaft.

6. The implement set forth in claim 5, wherein said tipping bearing assembly comprises a first member pivotally secured to the frame for swinging movement about a transverse axis, a second member secured to said first member and rotatable about a normally vertically extending axis, and a bearing supported on said second member for movement about a normally transversely extending axis.

7. The implement set forth in claim 1, wherein the power input shaft on the header is disposed at a slight angle to the fore-and-aft center line of the implement.

8. A drawn mower-conditioner adapted to be propelled forwardly by a conventional farm tractor having a power take-off (PTO) shaft, said mower-conditioner comprising, in combination:
   a frame including a fore-and-aft extending frame member and a rear transversely extending frame member secured at one end to a rear portion of the fore-and-aft extending frame member,
   vertically shiftable wheel means carried by said frame and operable to shift the frame between a lowered working position and a raised transport position,
   a header,
   a parallel link means mounting said header on the frame for vertically shifting movement relative to the frame through a range of operative positions when the frame is in its lowered working position,
   power driven mower, reel, and conditioning rolls mounted on the header,
   a header mounted power input shaft drivingly interconnected with said mower, reel, and conditioning rolls, and
   drive means operable to transmit power from the PTO shaft to the header mounted input shaft with minimal anglar acceleration as the header moves vertically through its range of operative positions and as the frame moves relative to the farm tractor, said drive means including:
   a shaft rotatably journalled on the fore-and-aft extending frame member and in parallel relationship to the power input shaft,
   a rear telescoping drive shaft interconnected with the frame journalled shaft and the power input shaft by universal joint means,
   a forward drive shaft of fixed length interconnected at its forward end with the PTO shaft by means of a universal joint, and
   a forward telescoping drive shaft interconnected with the forward shaft of fixed length and the frame journalled shaft by front and rear universal joint means, the forward end of the forward telescoping drive shaft being supported by tipping bearing means, said tipping bearing means being mounted on the forward end of the fore-and-aft extending frame member.

References Cited

UNITED STATES PATENTS

| | | | |
|---|---|---|---|
| 3,070,940 | 1/1963 | Van Der Lely | 56—24 |
| 3,116,582 | 1/1964 | Wathen et al. | 56—1 |
| 3,325,981 | 6/1967 | Glass et al. | 56—23 |

LOUIS G. MANCENE, Primary Examiner

J. A. OLIFF, Assistant Examiner

U.S. Cl. X.R.

56—1, 208, 228